(12) United States Patent
Djukic et al.

(10) Patent No.: US 10,333,779 B2
(45) Date of Patent: Jun. 25, 2019

(54) SYSTEM AND METHOD FOR PROVIDING A SOFTWARE DEFINED PROTOCOL STACK

(71) Applicant: Huawei Technologies Co., Ltd., Shenzhen (CN)

(72) Inventors: Petar Djukic, Ottawa (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 13/952,489

(22) Filed: Jul. 26, 2013

(65) Prior Publication Data
US 2014/0310388 A1 Oct. 16, 2014

Related U.S. Application Data

(60) Provisional application No. 61/810,608, filed on Apr. 10, 2013.

(51) Int. Cl.
| | |
|---|---|
| *H04L 12/24* | (2006.01) |
| *H04L 12/26* | (2006.01) |
| *H04L 12/721* | (2013.01) |

(52) U.S. Cl.
CPC ........ *H04L 41/0816* (2013.01); *H04L 41/083* (2013.01); *H04L 41/5019* (2013.01);
(Continued)

(58) Field of Classification Search
USPC ................................................ 709/221, 223
See application file for complete search history.

(56) References Cited

U.S. PATENT DOCUMENTS

| | | | |
|---|---|---|---|
| 9,252,972 B1 * | 2/2016 | Dukes | .................... H04L 49/70 |
| 2005/0055689 A1 | 3/2005 | Abfalter et al. | |

(Continued)

FOREIGN PATENT DOCUMENTS

| | | |
|---|---|---|
| CN | 101742370 A | 6/2010 |
| CN | 102946365 A | 2/2013 |

OTHER PUBLICATIONS

International Search Report and Written Opinion received in International Patent Application No. PCT/CN2014/075048, dated May 23, 2014, 10 Pages.

(Continued)

*Primary Examiner* — Hermon Asres
(74) *Attorney, Agent, or Firm* — Slater Matsil, LLP

(57) ABSTRACT

Embodiments are provided for a framework for networks with software defined protocols (SDP) network nodes. The embodiments include a SDM controller component for managing and controlling a data plane protocol for SDP network nodes. The SDP controller also interacts with a software defined networking (SDN) controller for determining one or more paths in a network including the SDP network nodes. The SDP controller is configured to determining a break-down of data plane process functionality into a plurality of basic process function blocks for a service, traffic flow, or virtual network in accordance with network component capabilities or quality of service/experience requirement. A workflow and status information are also determined for one or more network components along a path allocated, by the SDN controller. The workflow and status information are indicated to the one or more components, which are configured to implement the workflow using the basic process function blocks.

32 Claims, 11 Drawing Sheets

(52) U.S. Cl.
CPC .......... *H04L 41/5041* (2013.01); *H04L 43/08* (2013.01); *H04L 45/38* (2013.01)

(56) References Cited

U.S. PATENT DOCUMENTS

| | | | | |
|---|---|---|---|---|
| 2006/0130053 A1* | 6/2006 | Buljore | ................ | H04W 8/245 717/173 |
| 2006/0203722 A1* | 9/2006 | Oommen | ................ | H04L 41/50 370/229 |
| 2007/0058669 A1* | 3/2007 | Hoffmann | ............... | H04L 29/06 370/466 |
| 2008/0137548 A1* | 6/2008 | Hassan | ................ | H04W 28/18 370/252 |
| 2008/0176518 A1 | 7/2008 | Pascht et al. | | |
| 2011/0211583 A1* | 9/2011 | Seetharaman | .......... | H04L 45/00 370/400 |
| 2013/0286868 A1* | 10/2013 | Oyman | ................ | H04W 24/06 370/252 |
| 2014/0112150 A1* | 4/2014 | Ko | .......................... | H04L 47/24 370/236 |
| 2016/0020946 A1* | 1/2016 | Morper | ............... | H04L 41/0806 709/222 |

OTHER PUBLICATIONS

Kent et at., "Security Architecture for the Internet Protocol", RFC 4301, Network Working Group Standards Track, Dec. 2005, 1 Page.

Kohler et al., "Datagram Congestion Control Protocol (DCCP)", RFC 4340, Network Working Group, Mar. 2006, 115 pages.

Luby et al., "RaptorQ Forward Error Correction Scheme for Object Delivery", RFC 6330, Internet Engineering Task Force, Aug. 2011, 69 Pages.

Postel, J., "User Datagram Protocol", RFC 768, ISI, Aug. 28, 1980, 3 pages.

Schmidt, D. C., et al., "ADAPTIVE A Dynamically Assembled Protocol Transformation, Integration, and eValuation Environment," Department of Information and Computer Science, Jun. 1993, pp. 1-11.

Tennenhouse, D. L., et al., "A Survey of Active Network Research," IEEE Communications Magazine, vol. 35, Issue: 1, Jan. 1997, pp. 80-86.

Touch, J. D., et al., "A Recursvie Network Architecture," ISI-TR-2006-626, Oct. 20, 2006, pp. 1-9.

Dutta, R., et al., "The SILO Architecture for Services Integration, controL, and Optimization for the Future Internet," IEEE International Conference, Jun. 24-28, 2007, pp. 1899-1904.

Srinivasan, S., et al., "NetServ: Dynamically Deploying In-network Services," Department of Computer Science, Dec. 1, 2009, 5 pages.

Wagner, D., et al., "Dynamic Protocol Functionality in Cognitive Future Internet Elements," Future Network and Mobile Summit, IEEE Conference Publications, Jun. 2010, pp. 1-10.

Henke, C., et al., "Network Functional Composition: State of the Art," Telecommunications Networks and Applications Conference, 2010 Australasian, IEEE Conference Publications, Oct. 31, 2010-Nov. 3, 2010, pp. 43-48.

Information Sciences Institute, "Transmission Control Protocol Darpa Internet Program Protocol Specification", RFC 793, Sep. 1981, 90 Pages.

Martin Casado et al., "Fabric: A Retrospective on Evolving SDN," Hot Topics in Software Defined Networks, ACM, New York, NY, Aug. 13, 2012, XP058008069, pp. 85-89.

Jeongkeun Lee et al., "Network Integrated Transparent TCP Accelerator," 2010 24th IEEE International Conference on Advanced Information Networking and Applications, Piscataway, NJ, USA, Apr. 20, 2010, pp. 285-292.

\* cited by examiner

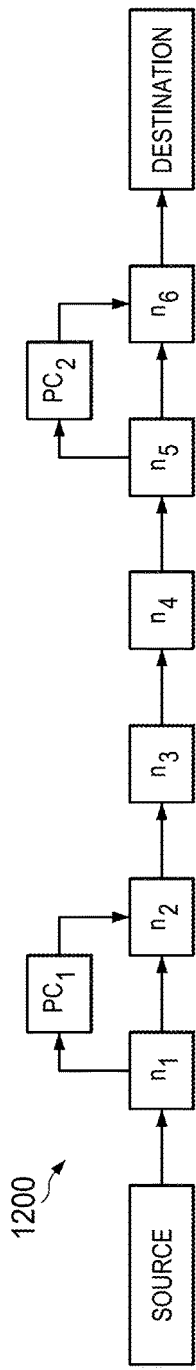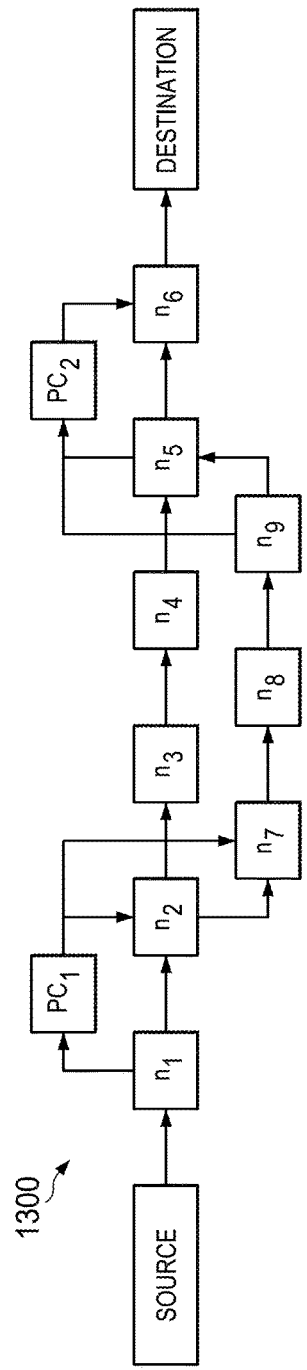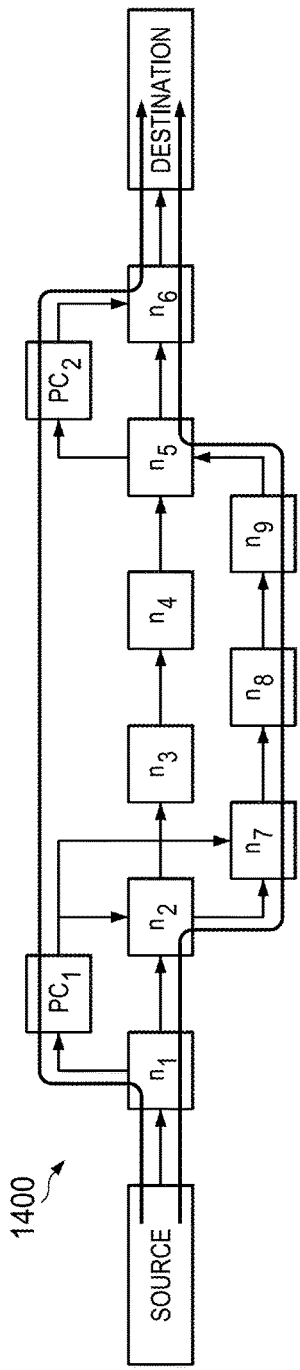

SYSTEM AND METHOD FOR PROVIDING A SOFTWARE DEFINED PROTOCOL STACK

This application claims the benefit of U.S. Provisional Application No. 61/810,608 filed on Apr. 10, 2013 by Petar Djukic et al. and entitled "System and Method for a Framework for Managed Networks with Software Defined Protocol Stack," which is hereby incorporated herein by reference as if reproduced in its entirety.

TECHNICAL FIELD

The present invention relates to the field of network communications, and, in particular embodiments, to a system and method for a framework for managed networks with software defined protocol stack.

BACKGROUND

Current network data plane protocol is based on an end-to-end 7-layer protocol stack. There is an independent process within each layer and interaction between independent layers is via primitives between layers. Many of the functions of end-to-end data plane process co-exist with lower layer per link data process function in the network. The current protocol stack is pre-configured and fixed, so it cannot efficiently adapt to network changes. The current protocol stack design provides a limited number of options that prevents it from the tightly matched provisioning of per application quality of experience (QoE). The current protocol stack also treats all end-to-end hosts the same, but many new/future services/applications, e.g., machine-to-machine (M2M) communications, may require a custom protocol stack. There is a need for an improved protocol stack that efficiently adapts and implements the data planes based on application needs and requirements.

SUMMARY OF THE INVENTION

In accordance with an embodiment, a method implemented by a network device for providing software defined protocols (SDP) includes determining, using a SDP controller, a break-down of data plane process functionality into a plurality of basic process function blocks. The method further includes determining, for one or more network components along a path in a network, a protocol stack comprising a subset of the basic process function blocks in accordance with quality of service (QoS) requirement or Quality of Experience (QoE) requirement. The one or more network components are then configured to implement the subset of the basic process function blocks.

In accordance with another embodiment, a method implemented by a network device for providing SDP includes determining, using a SDP controller, a break-down of data plane process functionality into a plurality of basic process function blocks for each service, traffic flow, or virtual network handled by the SDP controller in accordance with network component capabilities, QoS requirement, or QoE requirement. The method further includes determining, for one or more network components along a path allocated for the service, traffic flow, or virtual network, a workflow and status information for each of the basic process function blocks. The workflow and the status information are indicated to the one or more components, which are configured to implement the workflow using the basic process function blocks.

In accordance with another embodiment, a method for providing SDP includes determining, using a SDP controller, a protocol stack for managing a data plane process. The protocol stack comprises a plurality of basic process function blocks. The method further includes interacting with a SDN controller for determining a path for data forwarding according to the protocol stack. The SDP controller also configures one or more network components or devices on the path to implement the basic process function blocks.

In accordance with another embodiment, a network device configured for providing SDP includes at least one processor and a computer readable storage medium storing programming for execution by the at least one processor. The programming includes instructions to break down, using a SDP controller, a data plane functionality for a service, traffic flow, or a virtual network into a plurality of basic process function blocks. The programming includes further instructions to determine, for one or more network components along a path in a network, a protocol stack comprising a subset of the basic process function blocks in accordance with QoS requirement. The network device also configures the one or more network components to implement the subset of the basic process function blocks.

In accordance with another embodiment, a method by a network component for supporting SDP includes receiving, from a SDP controller, a workflow and status information for one or more of basic process function blocks. The basic process function blocks are generated by the SDP controller for breaking down data plane process functionality for a service, a traffic flow, or a virtual network in accordance with network component capabilities, QoS requirement, or QoE requirement. The method further includes implementing, at the network component, the workflow of the one or more basic process function blocks using the status information.

In accordance with yet another embodiment, a network component configured for supporting SDP includes at least one processor and a computer readable storage medium storing programming for execution by the at least one processor. The programming includes instructions to receive, from a SDP controller, a workflow and status information for one or more of basic process function blocks. The basic process function blocks are generated by the SDP controller for breaking down data plane process functionality for a service, a traffic flow, or a virtual network in accordance with network component capabilities, QoS requirement, or QoE requirement. The programming at the network component includes further instructions to implement the workflow of the one or more basic process function blocks using the status information.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 12 illustrates an example of path selection for a flow;

FIG. 13 illustrates another example of path selection for a flow;

FIG. 14 illustrates another example of path selection for a flow; and

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
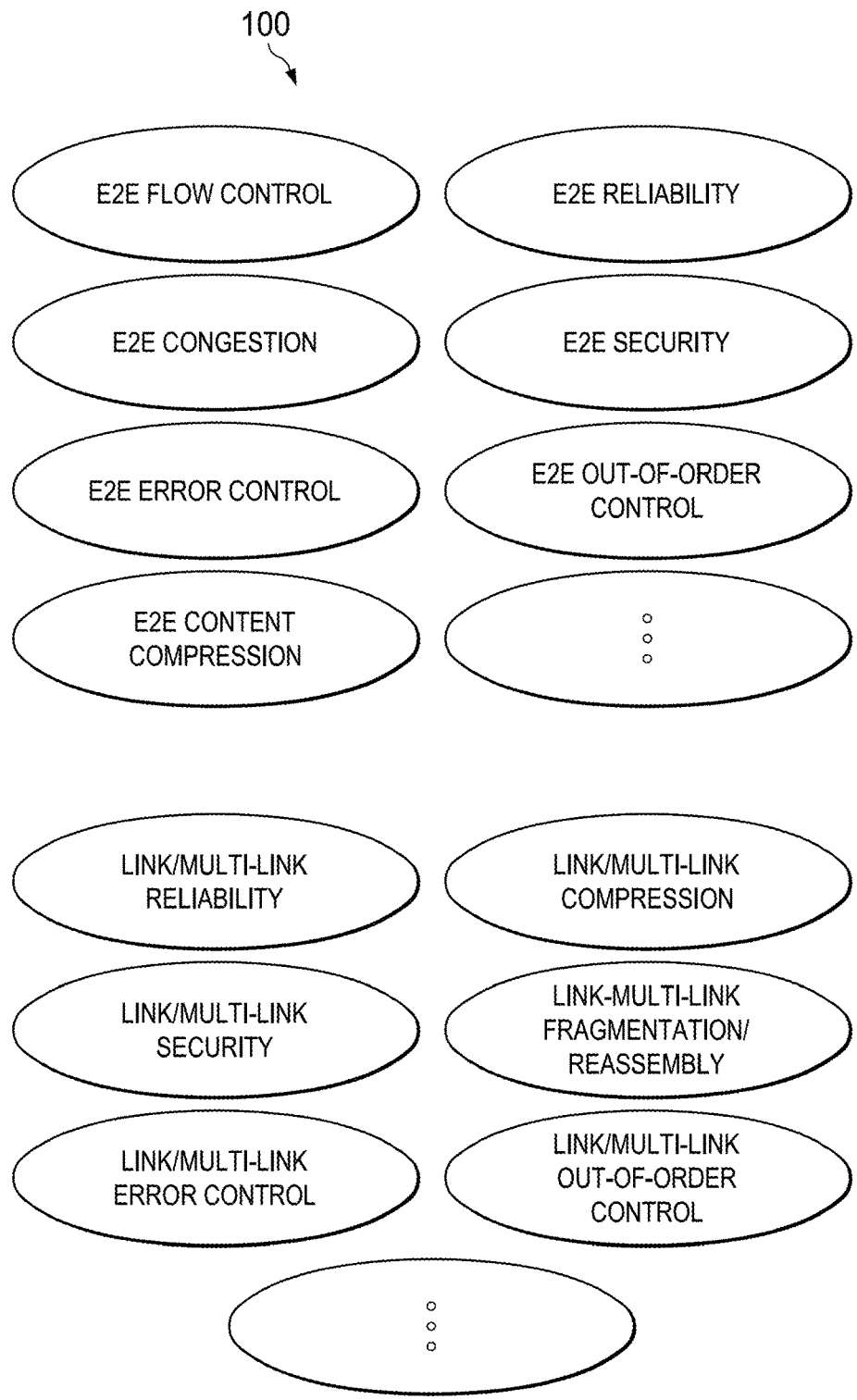
FIG. 1 illustrates an embodiment of data plane function blocks for software defined protocols (SDP)

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Future networks may have simultaneously co-existing traffics with multiple types of service or nature, e.g., video traffic and machine-to-machine (M2M) traffic. To optimize the network performance and provide services to a variety of coexisting quality of service (QoS) classes, future networks may require centralized management with software defined networking (SDN) techniques to accomplish all of their QoS objectives. However, even with SDN, the performance of the networks may still be limited by their underlying protocols. As new protocols are added dynamically through the use of software-defined protocol (SDP) network elements, or static network elements implementing new protocols (protocol converters), SDN controllers need to be aware of data plane protocol differences, which are to be implemented with SDP network elements. Currently, SDN controllers are not aware of protocol differences or wedging of SDP network elements of protocol converters. Currently, there is no efficient SDP controller providing dynamic operation and interaction with a SDN controller.

In current and future networks, new protocols may be added dynamically through the use of SDP network nodes. The SDP network nodes may enhance the performance of current network nodes, which typically do not enhance protocols. The terms SDP network node and SDP network element are used herein interchangeably to refer to a SDP entity or component, or virtual SDP entity or component, with the same SDP functionalities. Current protocol converters may not be sufficiently sophisticated for such purpose. For example, current Internet Protocol Security (IPsec) type services that are implemented do not provide reliability over multiple hops or congestion control. Similarly, TCP-splitting solutions (e.g., I-TCP) do not provide enhanced security features.

Embodiments are provided herein for a framework for networks with software defined protocol (SDP) network nodes. In an SDP network node, protocols can be implemented in software. As such, new protocols can be installed on the node, and protocols can be changed or upgraded without replacing the SDP network node. Due to the management complexity of a data plane protocol allowing more options, the SDP network nodes may need to be controlled by an external SDP controller. Currently, there is no efficient SDP controller or an SDP controller providing dynamic operation and interaction with a SDN controller.

The embodiments include a SDP controller that selects a best protocol stack to accomplish a required QoS, for instance according to on-demand or as-needed basis. The SDP controller can configure any SDP configurable node in the network using data plane function blocks 100 and a SDP defined workflow to implement the function blocks, as described in detail below. The SDP controller interacts with a SDN controller for selecting a path and/or nodes in the network for handling a service, traffic flow, or a virtual network. The SDP controller then configures the nodes along the path according to the SDN controller's information. The SDP controller and SDN controller may operate in a sequential manner (e.g., implementing SDN then SDP operations successively) or simultaneously (e.g., via interaction and coordination between the SDP and SDN controllers). The terms SDP controller and SDP manager are used herein interchangeably to refer to a SDP entity or component with the same SDP functionalities. Similarly, the terms SDN controller and SDN manager are used herein interchangeably to refer to a SDN entity or component with the same SDN functionalities.

The embodiments provide improved flexibility in the data plane. For example, protocols can be added after equipment is installed, finer protocol features can be enabled, as well as other features described below. Improved efficiency is also provided in the data plane (e.g., minimizing data plane overhead). Improved QoE performance can also be provided by providing a best or suitable match between the required QoS/QoE and data plane functionality, and further by adapting the data plane process to real-time network behavior.

FIG. 1 shows an embodiment of data plane function blocks 100 for SDP. A SDP controller can break down the data plane functionality into multiple basic functional blocks. The basic data plane process function blocks may comprise functions for flow control (e.g., including ordering and rate matching), reliability (e.g., including data loss identification, data loss indication, and data recovery), security (e.g., including end-to-end or network security), data forwarding, out-of-order control (e.g., including packet sequence numbers), fragmentation/reassembly, compression, congestion, error control, named content delivery (e.g., including content interest storage, content holder identification, content data blocks caching, content identification and content security verification), data aggregation (e.g., reverse multicast aggregation), data holding (e.g., delay-tolerant networking functions and retransmissions), and possibly other functions. Some of the functions 100 can be implemented as end-to-end (E2E) on end or edge nodes in a path across a network, per link on individual hops or multiple-links over many nodes along a path, or both (e.g., reliability function). Further, some of the functions 100 can be configured to work at different levels of complexity or increased functionality (e.g., security function).

Figure 2:
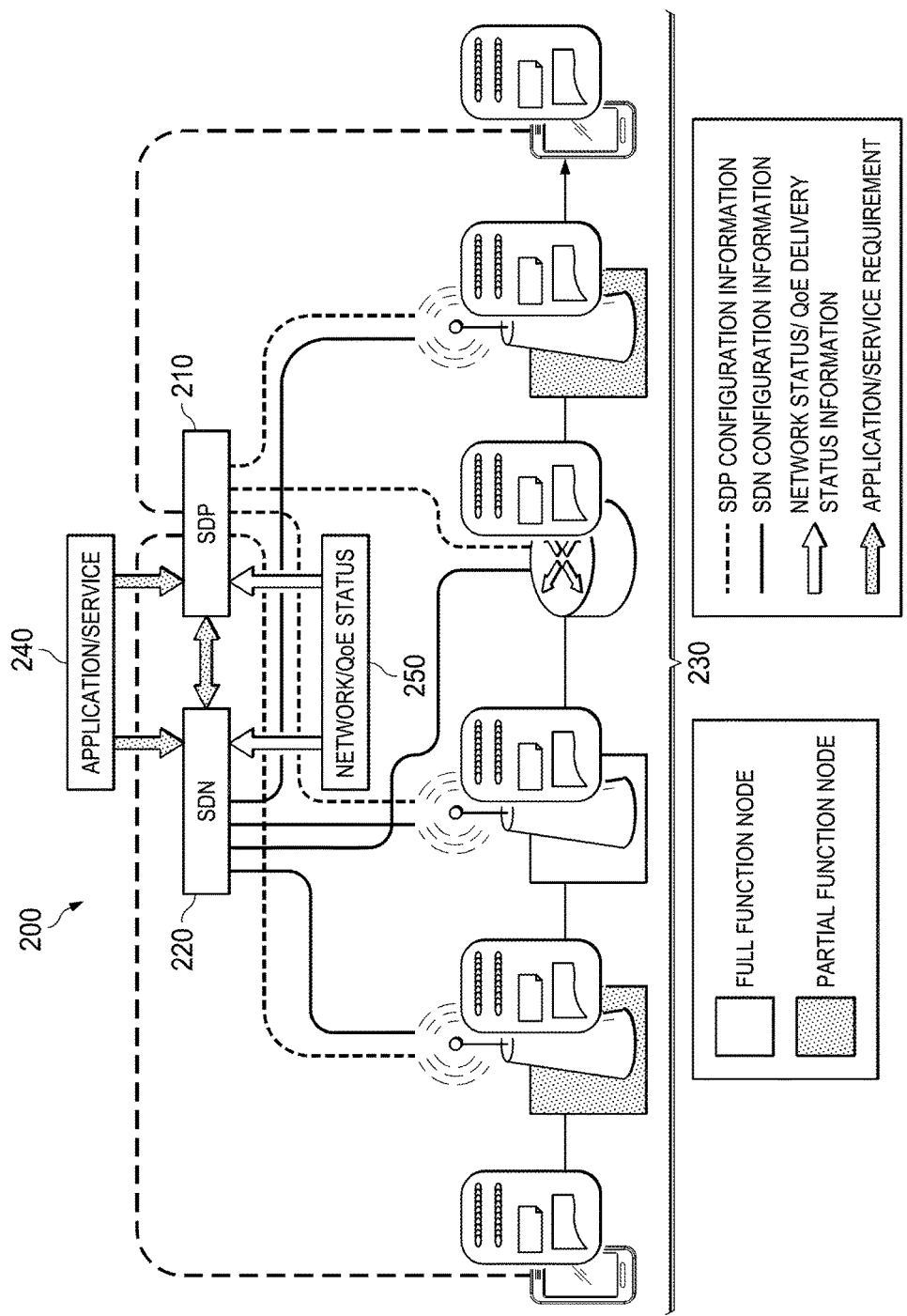
FIG. 2 illustrates an embodiment scheme of software defined networking (SDN) and SDP interaction.

FIG. 2 shows an embodiment scheme 200 of SDP and SDN interaction. There are multiple types of nodes with different capabilities of data process functionalities. A centralized SDP controller 210 controls the end-to-end data plane process (from data source to data sink) between network edge nodes 230, such as base stations, user devices, and/or edge nodes. Controlling the end-to-end data plane process includes controlling any suitable (SDP configurable) node in the path including any suitable or configurable edge node 230. The SDP controller also interacts with a SDN controller 220. The SDP controller 210 and SDN controller 220 receive application/service requirement information 240 and network/QoE status information 250 from the network. With the application information and network status information, the SDN controller chooses the paths for each end-to-end flow or set of end-to-end flows, or set of end-to-end flows belonging to the same virtual network. Accordingly, the SDN controller provisions the data plane protocols for the flows or virtual networks throughout the network. Multiple flows may share the same paths and protocols, for example if they are a part of the same virtual network (VN).

Figure 3:
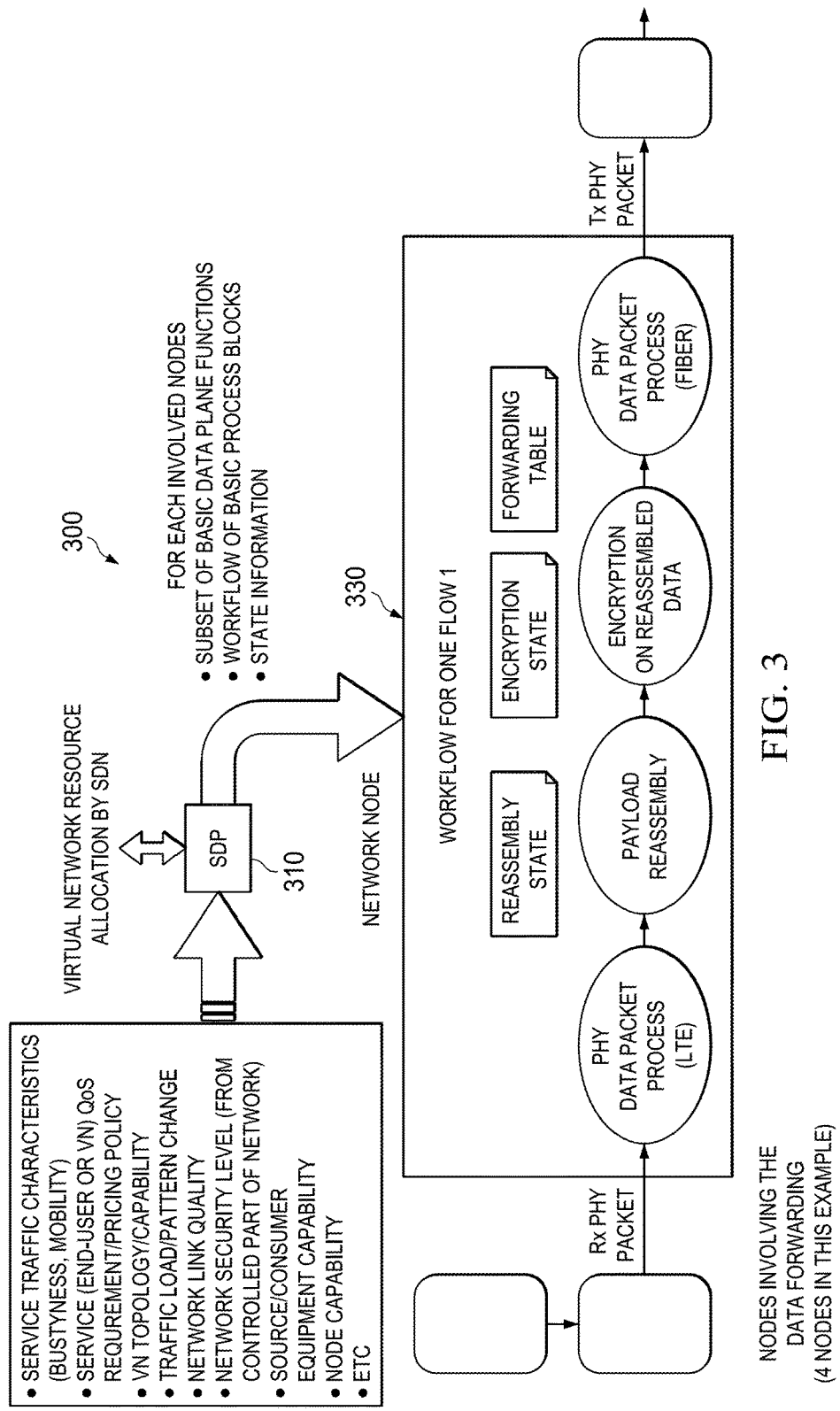
FIG. 3 illustrates an embodiment of SDP workflow.

FIG. 3 shows an embodiment of a SDP workflow 300. With respect to the interaction between SDN and SDP controllers, the SDN controller provides connectivity service which corresponds to generic (or any) network resource. The SDN controller informs the SDP controller 310 of the allocated network resource. The SDP controller 310 provides the data plane process strategy for each involved network node 330. The network node 330 may be any SDP configurable network node (including virtual network nodes) indicated by the SDN controller or on a path indicated by the SDN controller. The SDP controller 310 can determine the set of data process functionality for SDP-enabled (SDP configurable) nodes/devices by considering the impact of data plane process functionality of other non-SDP-enabled nodes/devices. The SDP-enabled and non-SDP-enabled nodes may be indicated by the SDN controller. The nodes may include low level nodes with respect to data capability, for instance nodes with limited hardware, storage and/or processing capability (e.g., physical layer processing only). The nodes may include middle data capability nodes that have higher capability for data processing (e.g., above the physical layer) in comparison to the low level data capability node. The nodes also include high level data capability nodes having higher data processing capability than the middle level nodes. The SDP-enabled nodes may include any combination of high level, middle level, and low level node with respect to data processing capability. The nodes may also be virtual, e.g., implemented in software and capable of migrating across the network as instructed by software defined topology (SDT) controller (not shown in figure). Examples of data processing capability include deep packet inspection (DPI) and/or other upper data plane processes, packet filtering, address translation, and other data processing related capabilities.

To determine the set of data process functionality for SDP-enabled nodes/devices, the SDP controller 310 uses information, such as data plane process capability, service traffic characteristics, service QoS requirement/pricing policy, virtual network (VN) topology/capability, traffic load/pattern change, network link quality, network security level, source/consumer equipment capability, node capability, and/or other suitable criteria. For instance, the SDP controller 310 may obtain data plane process capability of the considered nodes from a database of network node capability. Similarly, other information for determining the set of data process functionality may be stored in a shared database or corresponding databases. Work-flow strategy may include a subset of data plane functions (e.g., reassembly, encryption), workflow order of basic process blocks and their dependency, and state information. Some of the data plane process may impact the resource required, e.g., reliability. The SDN and SDP controllers may also use joint optimization or interaction. For example, the SDN controller uses a set of criteria to determine path selection, and the SDP controller uses another set of criteria to determine protocol selection on the paths. There may be iterations between the SDP and SDN controllers. For example if the SDP controller cannot provision the required protocols on the paths, the SDP controller informs the SDN controller and waits until another path or new nodes are indicated by the SDN controller. The SDN may determine path selection from a given sub-set of paths based on another set of criteria, which may be provided by the SDP controller.

Figure 4:
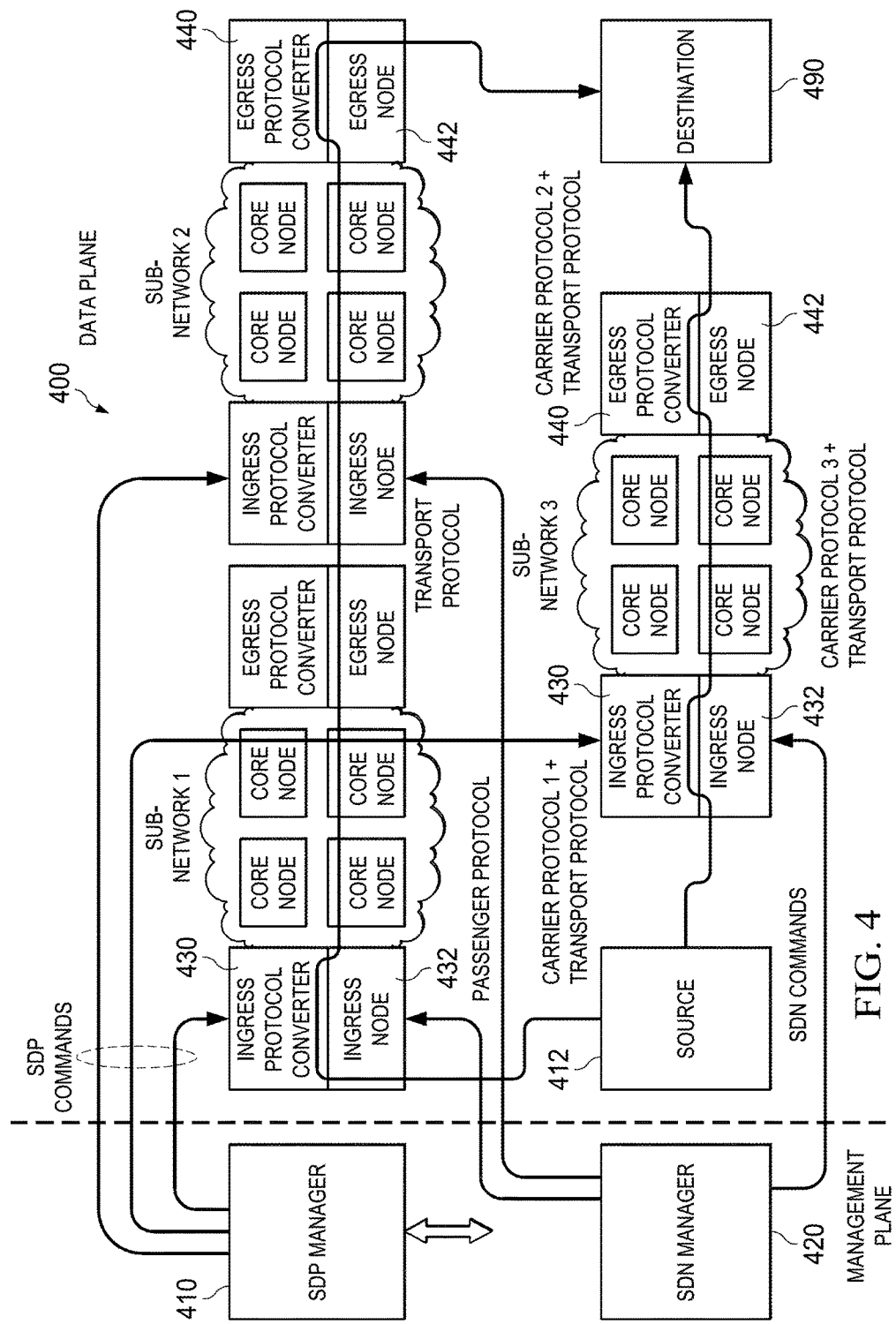
FIG. 4 illustrates an embodiment of components of a software defined protocol network.

FIG. 4 shows an embodiment of components 400 of a software defined protocol network. Sub-network components collaborate to form an end-to-end network to carry an end-to-end passenger protocol. A sub-network is a portion of a network, a virtual network within a network, or any other grouping of virtual or actual components in a network. A host 412 may be provisioned to use multiple paths (indicated by arrows), over multiple sub-networks (sub-networks 1, 2, and 3) to send data to a destination 490. Each sub-network may be provisioned to use a different combination of passenger and carrier protocols. The transport protocols are set to be the same if they are connecting two sub-networks. Transport protocols may be wired (e.g., using IEEE 802.3, IP, ATM), or wireless (e.g., using IEEE 802.11, IEEE 802.15, LTE, WiMAX,).

A passenger protocol is a protocol used by end-to-end hosts. A carrier protocol is a protocol that is used internally by the network to accomplish some QoS/QoE requirements (e.g., TCP, IPsec, HTTP-DASH). The QoS/QoE can be specified as the required end-to-end reliability/security, or other protocol traits or functions. The QoS can also be specified as the required delay or packed loss performance or other measured traits. A carrier protocol may be used without modifying passenger protocol datagrams, with modifying or removing passenger protocol headers, or with modifying or removing passenger protocol headers and datagrams. A transport protocol is an underlying protocol in the network, which may provide no enhanced network services. If the network already provides end-to-end connectivity then a network protocol such as IP, PPP, or UDP may be used. If the network only provides next hop connectivity, then a network protocol, such as IP, or a MAC protocol such as LTE, or 802.11, 802.15, or pre-defined channels of an existing protocol (e.g., LTE's PDCCH, PDSCH, PUCCH, PUSCH, PBSCH) may be used as the transport protocol. In some cases the network may only provide the physical layer, while the SDP controller implements framing and the MAC layer. Table 1 below shows an embodiment of carrier protocols selection based on given QoS requirements. The protocols used may include reliable multicast transport (RMT) protocol with raptor codes such as defined in IETF RFC6330, transmission control protocol (TCP) such as defined in RFC793, user datagram protocol (UDP) such as defined in RFC768, datagram congestion control protocol (DCPP) such as defined in RFC4340, and IPSec such as defined in RFC4301. In the Table 1, setting the congestion control requirement set to 'No' means that traffic has a guaranteed rate along the path using normal data path techniques (e.g., hop-by-hop scheduling with weighted fair queuing (WFQ), or guaranteed bit-rate (GBR) scheduler on wireless hop). Further, the fragmentation requirement is based on the carrier protocol maximum transmission unit (MTU) limitation.

TABLE 1

| Requirement | | | | | | | | |
|---|---|---|---|---|---|---|---|---|
| Reliability | No | Yes | No | Yes | No | Yes | No | Yes |
| Congestion control | No | No | Yes | Yes | No | No | Yes | Yes |
| Security | No | No | No | No | Yes | Yes | Yes | Yes |
| Protocol Selection | | | | | | | | |
| Transport protocol single path | UDP | RMT | DCPP | TCP | UDP | RMT | DCPP | TCP |
| Transport protocol multi-path | UDP | RMT | RMT + leaky bucket | RMT + leaky bucket | UDP | RMT | RMT + leaky bucket | RMT + leaky bucket |
| Sub-transport protocol without fragmentation | None | None | None | None | IPSec | IPSec | IPSec | IPSec |
| Sub-transport protocol with fragmentation | IP | IP | IP | IP | IP + IPSec | IP + IPSec | IP + IPSec | IP + IPSec |

A SDP controller 410 determines the combination of protocols to use on every hop or every segment in the network. A SDN controller 420 determines the path (sub-path) selection and path (sub-path) loading through the network, based on QoS provided by the SDP controller 410. The SDP and SDN controllers can work sequentially (in subsequent steps) or jointly (in simultaneous steps) on network sequence management and data plane processing for each considered service/application/VN, for example. An ingress SDP network node 430 transforms data packets of passenger protocol to packets of carrier protocol, as directed by the SDP controller 410. Ingress SDP network node may be the first element of a SDP network segment. An egress SDP network node 440 transforms data packets of carrier protocol to packets of passenger protocol, as directed by the SDP controller 410. An egress SDP network node may be the last element of a SDP network segment. An ingress SDP network node 430 forwards passenger protocol data packets and embeds them into carrier protocol packets as directed by the SDN controller 410. An egress SDP network node 440 extracts passenger protocol packets from the carrier protocol and forwards them as directed by the SDN controller 410. The ingress SDP network nodes 430 and the egress SDP network nodes 440 may include protocol converters, switches, or combinations of both protocol converters and switches. Additionally, one or more core switches or nodes in the sub-networks may not participate in SDP, and hence such components are unaware of protocol changes. For instance, the segments or the nodes in the paths between the ingress SDP network nodes 430 and the egress SDP network nodes 440 may not be configurable by the SDP controller 410 (non-SDP-enabled nodes).

In one scenario, a SDP network node interacts with the SDP/SDN controllers. The SDP network node can be considered a fully functioning node with respect to SDP. Alternatively, the SDP network node may be implemented as separate switch and protocol converters (on separate network nodes or components). A separate switch or a separate protocol converter may be considered a partially functioning node. A node with just the physical layer and no protocol functionality (such as a core node or switch) may be considered a light functioning node with respect to SDP. A combined protocol converter and switch may reside in end-to-end hosts, which may also be managed by the SDN/SDP controller. Further, a SDN controller may communicate with switches and a SDP controller may communicate with protocol converters separately. Alternatively, a combined SDP/SDN entity may communicate with either type of node. A protocol converter part of a SDP network node may implement a fixed custom protocol or as a family of custom protocols formed from protocol building blocks, as an active bridge which receives software to enable new protocols or protocol building blocks dynamically and possibly with each new flow. In yet another implementation, the protocol converter part of a SDP network node can be implemented using capsule packets that carry the protocol description or implementation before data packets reach the converter. The flows can be identified by 5-tuple sequence: source (src) id, destination (dst) id, src port, dst port, differentiated services code point (DSCP), or by VLAN or MPLS tags if the system supports label switching.

Figure 5A:
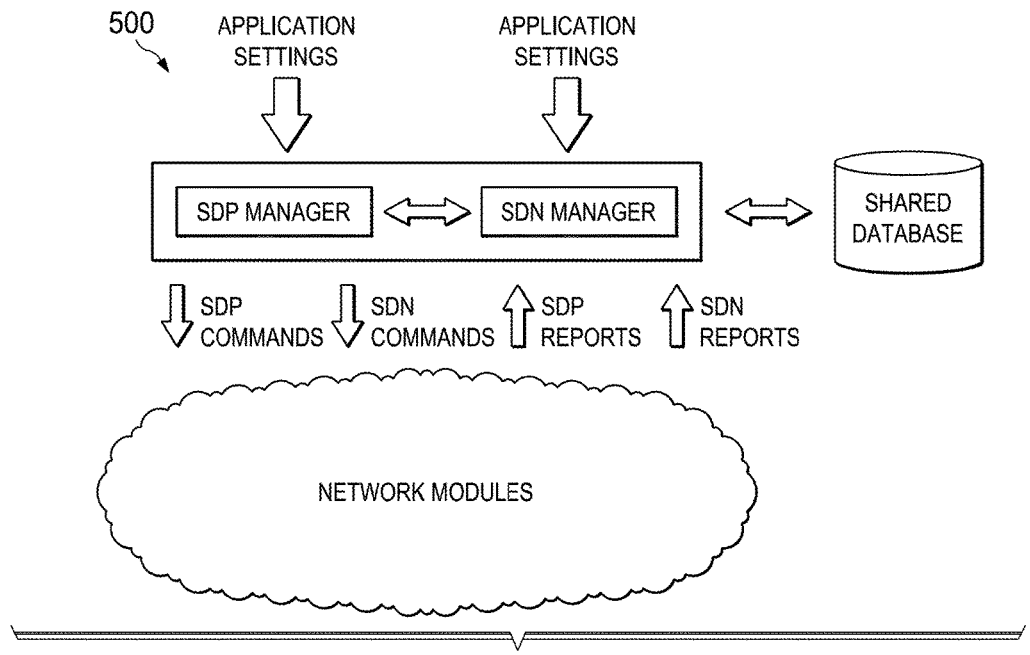
FIG. 5A illustrates an embodiment of a combined management module.
Figure 5B:
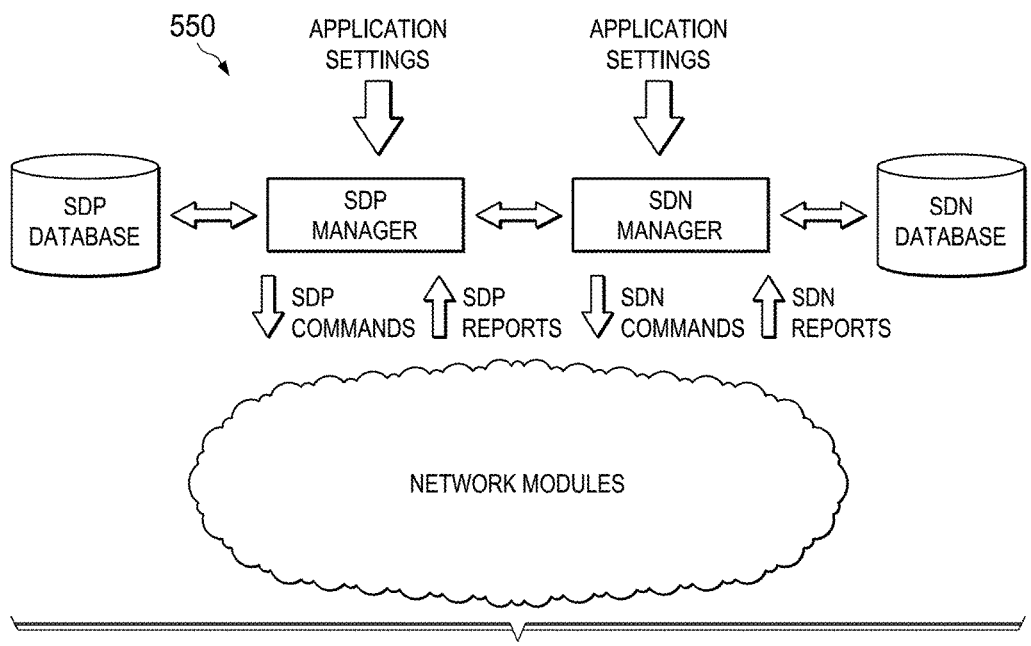
FIG. 5B illustrates an embodiment of a separate management module.

FIGS. 5A and 5B show management module architectures for interaction between SDN and SDP controllers, including a combined SDN and SDP management module 500 (in FIG. 5A) and a separate SDN and SDP management module 560 in (FIG. 5B). For the separate management module 500, commands may be combined into a joint message or separated into separate messages. Alternatively, commands from/to the shared management module 560 can be combined. SDP inputs (to the SDP controller) may include network topology, node capabilities (different types of nodes), network load, and application protocol requirements (reliability, security, reordering etc.). SDP outputs (from the SDP controller) may include a set of nodes to be configured using the protocol and provisioning of each protocol. The protocol components may include workflow (order of protocols functions), and/or protocol QoS parameters (re-transmission time, encryption level).

The SDN controller and SDP controller may be one entity (e.g., in a single physical or virtual machine) in the combined management module 500 or two separate entities in the separate management module 560. Further, the combined SDP and SDN controller (of the combined management module 500) may use a shared database (DB) for maintaining processing/management/control information, while the separate SDP and SDN controllers (of the separate management module 560) may each use a separate corresponding DB. Protocol converters and switches of the network modules that interact with the SDP/SDN controller(s) may also be implemented as a single combined entity (e.g., on a single network node) or two separate entities.

In an embodiment, the SDP network inputs include information about the nodes under consideration. The types of nodes may include end-to-end nodes, network edge-to-edge nodes, end-to-edge nodes, wireless nodes, wired nodes, fully enabled SDP network element nodes, partially-enabled SDP network element nodes, non-SDP (non-participating) network element nodes, virtual fully enabled SDP network nodes, virtual partially-enabled SDP network element nodes, and virtual non-SDP (non-participating) network nodes.

The functions of each node can be dynamically activated/deactivated by a centralized SDP controller based on inputs, such as service traffic characteristics (e.g., burstyness, mobility), service QoS requirement/pricing policy (e.g., for end-user or VN), VN topology/capability, traffic load/pattern change, network link quality, network security level (e.g., out of controlled part of network), source/consumer equipment capability, node capability, or other characteristics. In an embodiment, the SDP controller interacts with a control entity for performing software defined topology (SDT) for mapping between service logical topology and data plane logical topology, e.g., to determine the nodes to be configured on a path and select the proper basic process function blocks for the nodes. The SDP controller can receive from the control entity indication of required data processes for the considered nodes or other nodes in a determined data plane topology, and configure the nodes accordingly.

The SDP outputs include control information, such as a subset of basic data plane functions and workflow of basic process blocks. Information for each basic function (e.g., E2E or per link) may include information for reliability, security (e.g., per link or network segment), error control, fragmentation, and/or in-order assurance. The reliability information may include using automatic repeat request (ARQ) (e.g., for initialization and setup), state of ARQ state machine (for transferring), maximum number of retransmissions (e.g., for delay and reliability requests), holding time for received packet for possible packet loss in further forwarding, or other information. The security information (per link or network segment) may include key related information (e.g., key ID), or encryption related information (e.g., depending on the delay/battery of node, E2E security in place or not, security request). Examples of error control include indication for drop out-of-date or not, e.g., depending on delay requirement. Examples of the fragmentation information include Layer 2 (L2) packet size, e.g., depending on link capacity and load and scheduler interval. In-order assurance information may depend on delay and end equipment capability.

With respect to management protocol messages/commands, messages may be sent as a single-shot (e.g., upon demand) or periodically. The SDN message to a switch can be sent to set a given flow (e.g., using a network 5-tuple, VLAN ID, or MPLS tag) from an incoming port to an outgoing port. The SDN message may also include per-flow maximum allowed delay, minimum supported rate, or packet scheduling discipline (e.g., weight fair queue (WFQ), earliest deadline first (EDF)). The switch message to a SDN controller may include observed mean delay, observed head of line delay, queue size, incoming rate of flows, or outgoing rate of flows. The SDP controller messages to a protocol converter are protocol setup messages including, for instance, incoming port of a protocol, type of incoming protocol, or type of outgoing protocol. Protocol operational messages provide instructions about the protocol workflow to be undertaken for traffic flows, for example, actions to take with protocol datagrams such as fragmenting, encryption, reordering, rate control, or re-transmission. QoS setup messages provide, for example, minimum/maximum rate, maximum delay, or minimum/maximum datagram size. The QoS/QoE setup messages may also be single-shot or periodic.

Figure 6A:
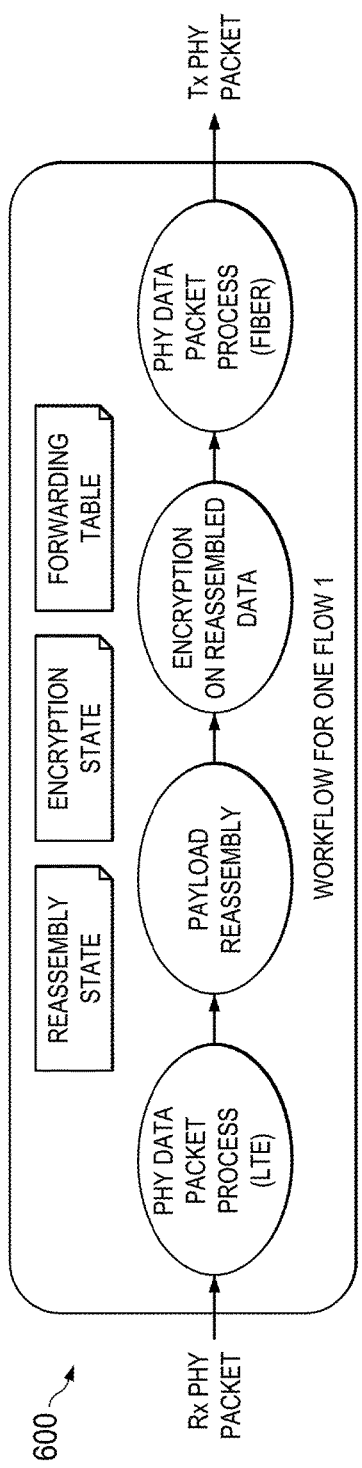
FIG. 6A illustrates an embodiment of a workflow.
Figure 6B:
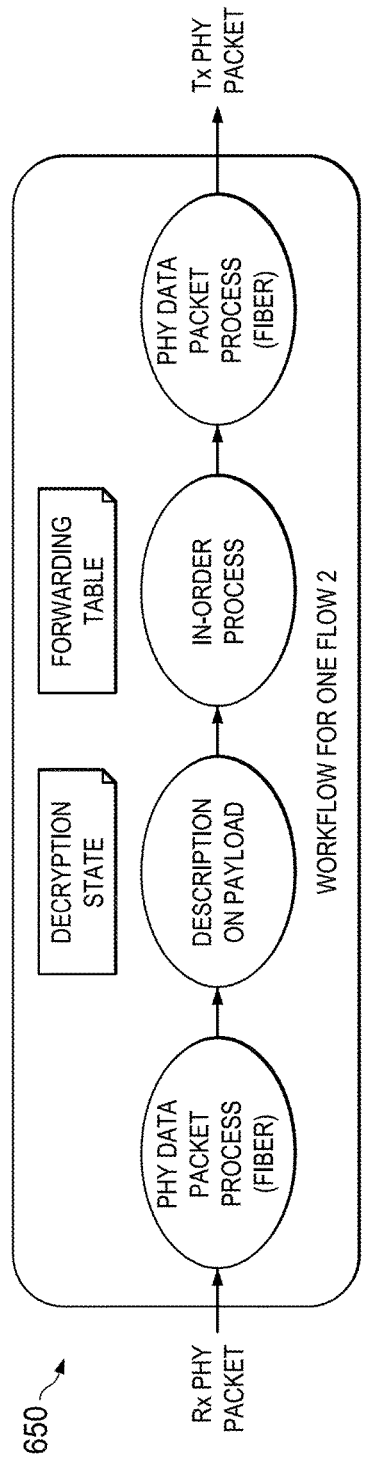
FIG. 6B illustrates another embodiment of a workflow.

FIGS. 6A and 6B show embodiments of workflows determined by SDP controller, including workflow 600 (in FIG. 600A) and workflow 650 (in FIG. 600B). The workflows can be implemented by a network node or any devices (e.g., user or terminal devices) that interacts and are configurable with the SDP controller. A workflow can be organized (by SDP controller) in blocks, which can be arranged into a variety of workflows (grouping or sequences of functions). Necessary state information is also provided to the node to implement a workflow. A node receives and transmits a physical packet before and after processing the packet. In workflow 600, the node is configured (by SDP controller) for payload reassembly using reassembly state information and then encryption using encryption state information. In workflow 650, the node is configured (by SDP controller) for payload decryption using decryption state information and then implementing in-ordering. The node can also be provided by SDP/SDN controllers forwarding table information to determine the processing and forwarding of the physical packet.

Figure 7:
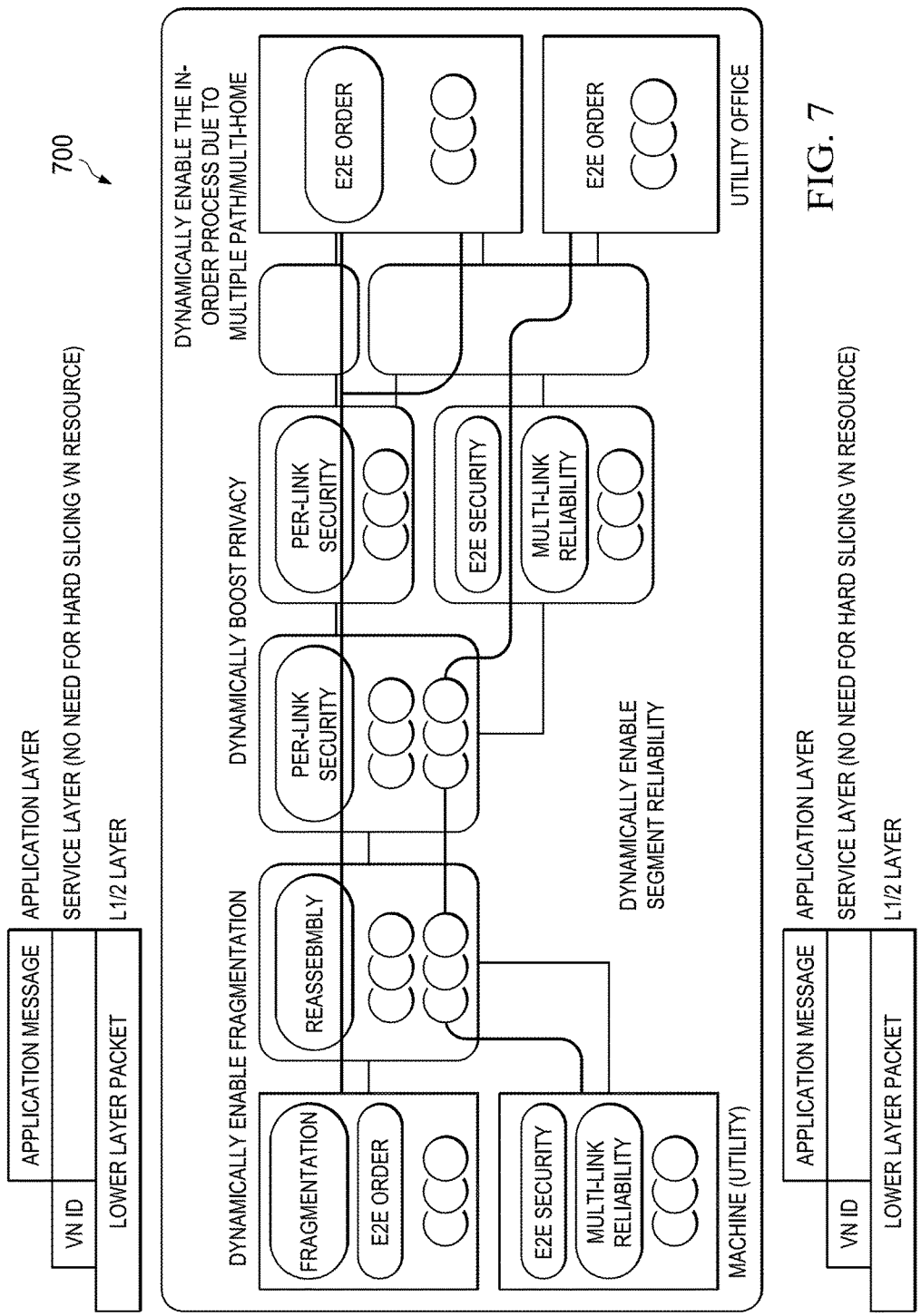
FIG. 7 illustrates an embodiment of SDP applications.

FIG. 7 shows an embodiment of SDP applications for handling, processing, and forwarding video frames and M2M messages from their corresponding sources and destinations. The frames/messages are each transmitted by a plurality of nodes in a network or sub-networks. Some of the nodes can be assigned to forward the two types of traffic. The workflow for the video frames includes dynamically enabling fragmentation and E2E ordering of video frames or segments (at the source and destination), reassembly of frames (e.g., at an ingress node), and providing security per link (e.g., at any one or more core nodes). The workflow for the E2E messages includes providing E2E security and multi-link reliability (e.g., at a core node).

Figure 8:
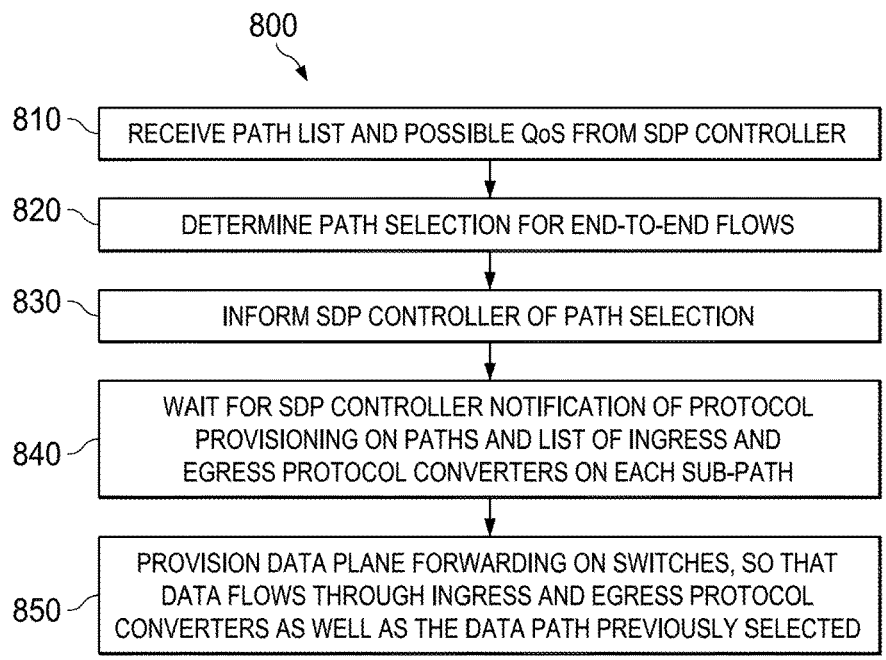
FIG. 8 is a process flow of an embodiment method of SDN controller operation.

FIG. 8 shows an embodiment method 800 for SDN controller operation. The method 800 can be implemented by a SDN controller (via software and/or hardware). At step 810, a path list and possible QoS information are received for a SDP controller. At step 820, the SDN controller determines path selection for one or more end-to-end flows. At step 830, the SDN controller informs the SDP controller of the path selection. At step 840, the SDN controller waits for SDP controller notification of protocol provisioning on paths and list of ingress and egress SDP network nodes on each sub-path. At step 850, the SDN controller provisions data plane forwarding, so that data flows through ingress and egress SDP network nodes as well as the data path previously selected.

Figure 9:
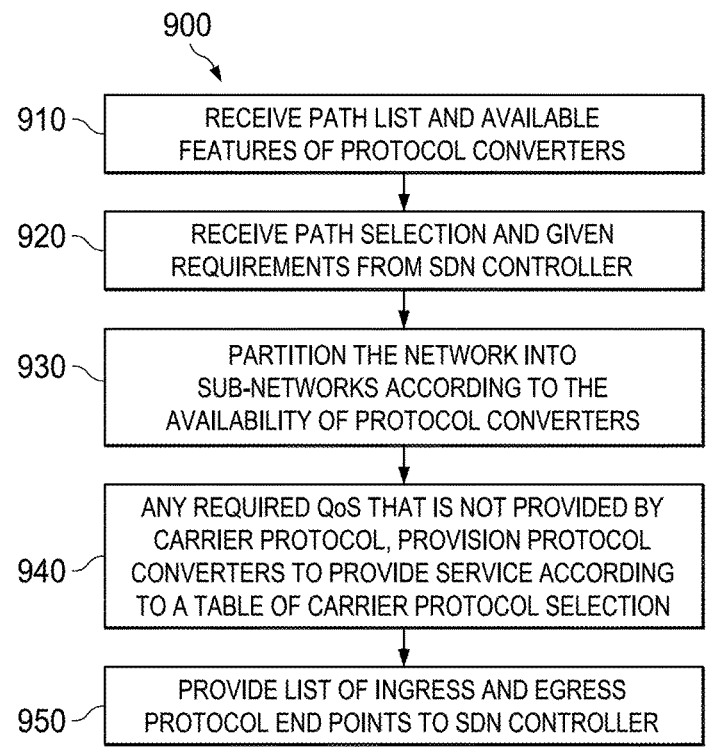
FIG. 9 is a process flow of an embodiment method of SDP controller operation.

FIG. 9 shows an embodiment method 900 for SDP controller operation. The method 900 can be implemented by a SDP controller (via software and/or hardware). At step 910, path list and available features of protocol converters are received (e.g., from a network). At step 920, path selection and given requirements are received from a SDN controller. At step 930, the network is partitioned into sub-networks according to the availability of SDP network nodes. At step 940, any required QoS that is not provided by carrier protocol, the SDP controller provisions protocol converters to provide service according to a table of carrier protocol selection.

Figures 10, 11:
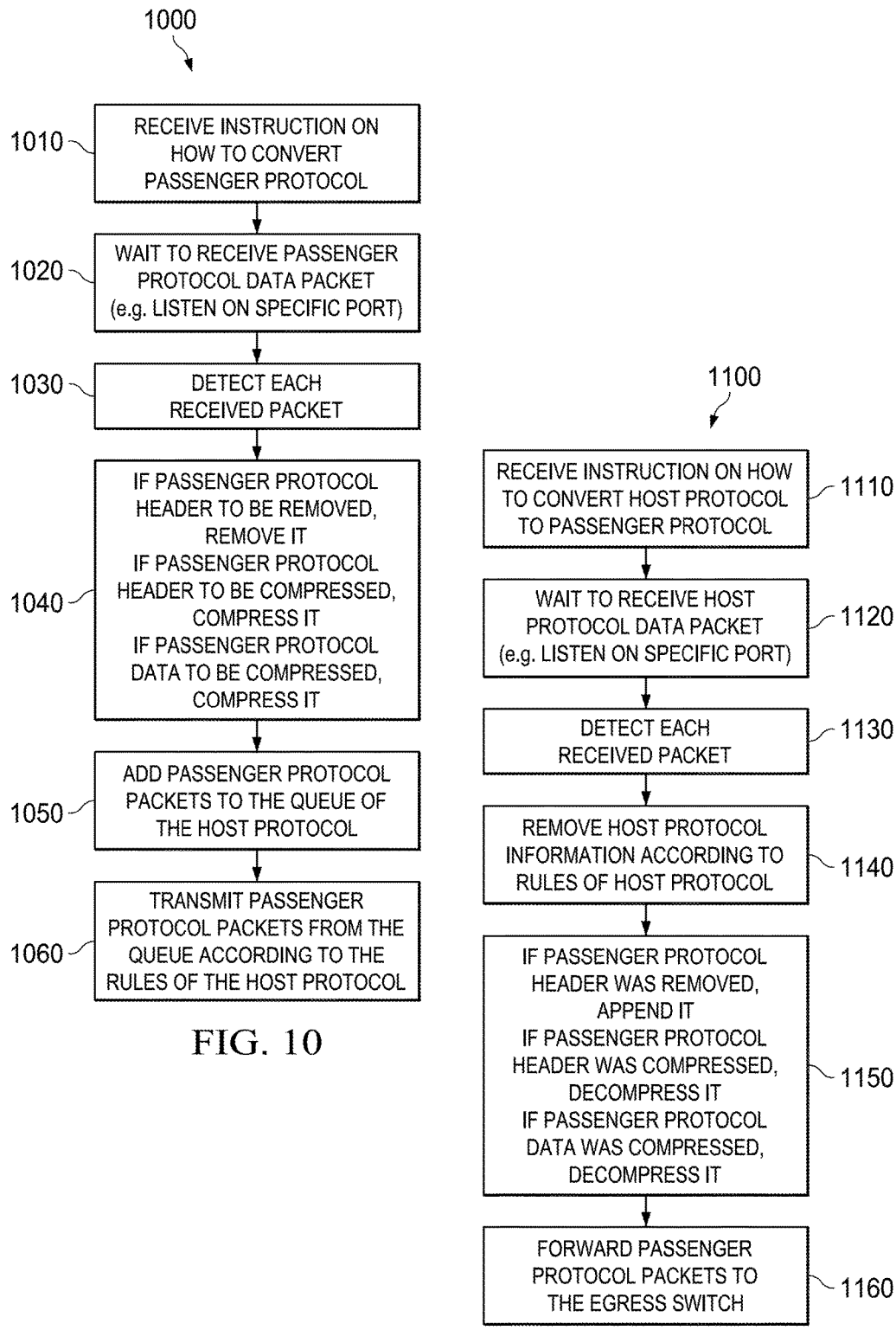
FIG. 10 is a process flow of an embodiment method for an ingress protocol converter.
FIG. 11 is a process flow of an embodiment method for an egress protocol converter.

FIG. 10 shows an embodiment method 1000 for an ingress SDP network node. At step 1010, the ingress protocol converter receives instruction on how to convert a passenger protocol. At step 1020, the ingress SDP network node waits to receive passenger protocol data packets (e.g., by listening on a specific port). At step 1030, the ingress protocol converter detects each received packet. At step 1040, the ingress protocol converter removes a passenger protocol header from the packet, if the passenger protocol is to be removed. Alternatively, the passenger protocol header is compressed if the passenger protocol header is to be compressed. The passenger data is also compressed if the passenger data is to be compressed. At step 1050, passenger protocol packets are added to the queue of the host protocol. At step 1060, passenger protocol packets are transmitted from the queue according to the rules of the host protocol.

FIG. 11 shows an embodiment method 1100 for an egress protocol converter. At step 1110, the egress protocol converter receives instruction on how to convert a passenger protocol to a carrier protocol. At step 1120, the egress protocol converter waits to receive host protocol data packets (e.g., by listening on a specific port). At step 1130, the egress protocol converter detects each received packet. At step 1140, the egress protocol converter removes carrier protocol information according to rules of the host protocol. At step 1150, the egress SDP network node appends a passenger protocol header if it was removed (e.g., by the ingress protocol converter). Alternatively, the passenger protocol header is decompressed if the passenger header was compressed. The passenger protocol data is also decompressed if it was compressed (by the ingress protocol converter).

An embodiment of SDN to SDP interaction includes the SDN choosing paths based on shortest-paths or k-shortest paths. Other methods such as load-balancing with linear programming are also possible. The list of paths for each end-to-end flow may be given to SDP controller with QoS requirements, e.g., in the form of $Flow_1$: $QoS_1$=(Reliable, $MinimumDelay_1$, $MinimumRate_1$), $P_1$=$(n_1, n_3, \ldots, n_{10})$, $P_2$=$(n_1, n_4, \ldots, n_{10})$ and $Flow_2$: QoS=(Secure/Reliable, $MinimumDelay_2$, $MinimumRate_2$), $P_4$=$(n_2, n_3, \ldots, n_{11})$, $P_5$=$(n_2, n_5, \ldots, n_{11})$. The reliable/secure process block influences protocol functionality selection, while the minimum delay and minimum rate process blocks influence protocol setting selection. The nodes considered for the paths may be wired or wireless switches/components. For each flow x and each path of flow x, the SDP controller can examine capabilities on every node in hop $(n_i, n_j)$ along the path p. The SDP controller makes a list of disjoint sub-paths, which have the protocol capabilities required by the flow (e.g., reliability or security). Protocol capabilities are based on switch or node capabilities. If the graph including the sub-paths is disjoint, the SDP controller can augment the paths with protocol converters to achieve the required protocol capability. The SDP returns a list of paths augmented with protocol converters to the SDP controller. Alternatively, if the SDP controller cannot find paths that satisfy protocol requirements, the SDP controller returns to the SDN controller a list of ineligible paths and the process starts again.

FIG. 12 illustrates an example of path selection for a flow, where a single path goes through the nodes $(n_1, n_2, n_3, n_4, n_5, n_6)$ and requires 128-bit encryption on every hop (indicated as horizontal lines with arrows). Only nodes $n_2, n_3, n_4, n_5$ support 128-bit compression, which makes the network disjoint with three components (source, $n_1$), $(n_2, n_3, n_4, n_5)$, and ($n_6$, destination). SDP network nodes $PC_1$ and $PC_2$ support 128-bit compression. Hence, the path is augmented to be $(n_1, PC_1, n_2, n_3, n_4, n_5, PC_2, n_6)$. The SDP network nodes $PC_1$ and $PC_2$ perform one sided protocol conversion. Alternatively, the single path that goes through the nodes $(n_1, n_2, n_3, n_4, n_5, n_6)$ requires end-to-end reliable communications (e.g., all packets are to be delivered in sequence). In this case, the SDP network nodes $PC_1$ and $PC_2$ support end-to-end reliable communications and perform two sided protocol conversion. Hence, the path is augmented to be $(n_1, PC_1, n_2, n_3, n_4, n_5, PC_2, n_6)$.

FIG. 13 illustrates a second example of path selection for a flow, where two paths go through nodes $(n_1, n_2, n_3, n_4, n_5, n_6)$ and $(n_1, n_2, n_7, n_8, n_9, n_5, n_6)$, respectively. The two paths require end-to-end reliable communications (e.g., all packets are to be delivered in sequence). SDP network nodes $PC_1$ and $PC_2$ support end-to-end reliable communications over multiple paths and perform one or two sided protocol conversion. Hence, the paths are augmented to be $(n_1, PC_1, n_2, n_3, n_4, n_5, PC_2, n_6)$ and $(n_1, PC_1, n_2, n_7, n_8, n_9, n_5, PC_2, n_6)$, respectively.

In another embodiment of SDP to SDN interaction, the SDP controller enumerates paths that satisfy protocol requirements. For instance, the SDP controller enumerates all paths using k-shortest paths and then prunes paths that do not meet the protocol requirements. One of the outputs is the list of protocols to be used on each path, sub-path, or link in the network SDP. The SDN controller chooses paths from that set based on shortest-paths or k-shortest paths on the virtual network. Other methods such as load-balancing with linear programming are also possible. The SDN controller gives a list of selected paths for each end-to-end flow to SDP with QoS requirements, e.g., $Flow_1$: $QoS_1$=(Reliable, $MinimumDelay_1$, $MinimumRate_1$), $P_1$=$(n_1, n_3, \ldots, n_{10})$, $P_2$=$(n_1, n_4, \ldots, n_{10})$ and $Flow_2$: $QoS_1$=(Secure/Reliable, $MinimumDelay_2$, $MinimumRate_2$), $P_4$=$(n_2, n_3, \ldots, n_{11})$, $P_5$=$(n_2, n_5, \ldots, n_{11})$. The reliable/secure process block influences protocol functionality selection, while the minimum delay and minimum rate influence protocol setting selection. The nodes may be switches or components in wired or wireless networks. The SDP controller provisions the protocol converters accordingly.

Alternatively, the SDP controller creates an overlay network of SDP network nodes which satisfy protocol requirements and then returns paths that go through those nodes only. One of the outputs is the list of protocols to be used on each path, sub-path, or link in the network SDP. The SDN controller chooses paths based on shortest-paths or k-shortest paths on the overlay network. Other methods such as load-balancing with linear programming are also possible. The SDN controller gives a list of paths for each end-to-end flow on the overlay network to the SDP controller with QoS requirements, e.g., $Flow_1$: $QoS_1$=(Reliable, $MinimumDelay_1$, $MinimumRate_1$), $P_1$=$(n_1, n_3, \ldots, n_{10})$, $P_2$=$(n_1,$ $n_4, \ldots, n_{10}$) and Flow$_2$: QoS$_1$=(Secure/Reliable, Minimum-Delay$_2$, MinimumRate$_2$), $P_4$=($n_2, n_3, \ldots, n_{11}$), $P_5$=($n_2, n_5, \ldots, n_{11}$). For each path, the SDP controller recreates the augmented path from the virtual network. The augmented path is given to the SDN controller to provision the SDP network nodes in the network. The SDP controller provisions the protocol converters.

FIG. 14 illustrates another example of a path selection for a flow. In this example, two paths go through nodes ($n_1, n_2, n_3, n_4, n_5, n_6$) and ($n_1, n_2, n_7, n_8, n_9, n_5, n_6$), respectively. Both paths require 128-bit end-to-end encryption. The SDP network nodes PC$_1$ and PC$_2$ support 128-bit encryption but other nodes do not. Hence, the SDP controller creates a virtual network topology (e.g., from the perspective of the data plane) with paths ($n_1$, PC$_1$, $n_2, n_3, n_4, n_5$, PC$_2$, $n_6$) and ($n_1$, PC$_1$, $n_2, n_7, n_5, n_9, n_5$, PC$_2$, $n_6$).

The SDP schemes above can be implemented for different network scenarios and components. In an embodiment, the SDP can be used to set up a compression protocol, encryption protocol, or reliability protocol on a wireless relay (e.g., serving as an intermediate hop) for wireless links. In another embodiment, a compression protocol, encryption protocol, or reliability protocol can be established on a wireless link (e.g., serving as a last hop) from host to host or last hop to host. In another embodiment, compression can be set up on a congested link or path, e.g., that serves as an intermediate hop. In another scenario, a sensor network may serve as a last hop, where a protocol converter can be used as a sensor network data aggregator. A one-to-many downlink protocol that takes advantage of known scheduled access (e.g., ID of sensor known from scheduled resource) can be implemented. A many-to-one uplink protocol that takes advantage of known scheduled access and uses random access can also be implemented. The network headers may be stripped before sending only data (data without headers). In another scenario, a network may use multi-path routing, where a forward error correction protocol is established to improve delay and reliability and to avoid acknowledgements. In yet another scenario, a network is shared by multiple virtual networks, where each network is embedded into the shared network.

Figure 15:
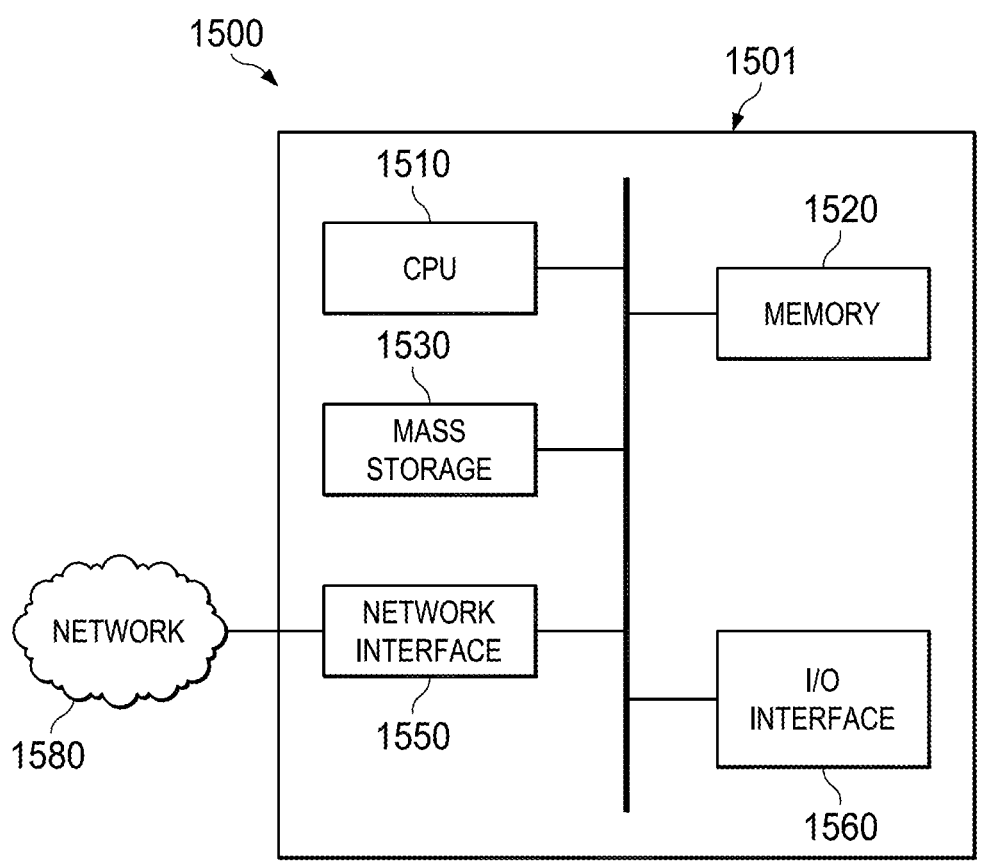
FIG. 15 is a diagram of a processing system that can be used to implement various embodiments.

FIG. 15 is a block diagram of an exemplary processing system 1500 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1500 may comprise a processing unit 1501 equipped with one or more input/output devices, such as a network interfaces, storage interfaces, and the like. The processing unit 1501 may include a central processing unit (CPU) 1510, a memory 1520, a mass storage device 1530, and an I/O interface 1560 connected to a bus. The bus may be one or more of any type of several bus architectures including a memory bus or memory controller, a peripheral bus or the like.

The CPU 1510 may comprise any type of electronic data processor. The memory 1520 may comprise any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs. In embodiments, the memory 1520 is non-transitory. The mass storage device 1530 may comprise any type of storage device configured to store data, programs, and other information and to make the data, programs, and other information accessible via the bus. The mass storage device 1530 may comprise, for example, one or more of a solid state drive, hard disk drive, a magnetic disk drive, an optical disk drive, or the like.

The processing unit 1501 also includes one or more network interfaces 1550, which may comprise wired links, such as an Ethernet cable or the like, and/or wireless links to access nodes or one or more networks 1580. The network interface 1550 allows the processing unit 1501 to communicate with remote units via the networks 1580. For example, the network interface 1550 may provide wireless communication via one or more transmitters/transmit antennas and one or more receivers/receive antennas. In an embodiment, the processing unit 1501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a network device for providing software defined protocols (SDP), the method comprising:
   receiving, by an SDP controller from a software defined networking (SDN) controller, indication of a path including a network component and corresponding network resource allocation;
   configuring, by the SDP controller, the network component to implement a first subset of a plurality of basic process function blocks using a first protocol stack comprising a first combination of protocols determined by the SDP controller, each of the plurality of basic process function blocks performing a function within a data plane, and the plurality of basic process function blocks performing a data plane process, wherein the basic process function blocks comprise functionality for at least one of flow control, rate matching, reliability, data recovery, data security, data forwarding, out-of-order control, fragmentation, reassembly, compression, congestion, error control, deep packet inspection (DPI), packet filtering, or address translation;

receiving, by the SDP controller, a quality of service (QoS) or quality of experience (QoE) requirement; and configuring, by the SDP controller, the network component to implement a second subset of the plurality of basic process function blocks using a second protocol stack determined in accordance with the received QoS or QoE requirement, wherein the second subset of the plurality of basic process function blocks is different than the first subset of the plurality of basic process function blocks, the second protocol stack comprises a second combination of protocols determined by the SDP controller in accordance with the received QoS or QoE requirement and comprising a transport protocol, and the second combination of protocols is different from the first combination of protocols, wherein the second combination of protocols comprises at least one of a passenger protocol recognized by end-to-end hosts on a network path, a carrier protocol implementing the second subset of the plurality of basic process function blocks, or the transport protocol for transporting traffic between components on the network path.

2. The method of claim 1 further comprising selecting, at the SDN controller, indication of a path including the network component and corresponding network resource allocation.

3. The method of claim 1, wherein a suitable subset of basic process function blocks according to a workflow order is generated for each considered service, traffic flow, or virtual network.

4. The method of claim 1 further comprising aggregating some of the basic process function blocks into a single data plane process.

5. The method of claim 1, wherein at least some of the basic process function blocks are implemented on end-to-end components or host components, or per link or hop on a network path.

6. A method by a network device for providing software defined protocols (SDP), the method comprising:
  receiving, by an SDP controller from a software defined networking (SDN) controller, indication of a path including a network component and corresponding network resource allocation;
  configuring, by the SDP controller the network component to implement a first workflow of a first plurality of basic process function blocks using a first protocol stack determined by the SDP controller;
  receiving, by the SDP controller a quality of service (QoS) or quality of experience (QoE) requirement;
  breaking down, by the SDP controller, a data plane process into a second plurality of basic process function blocks that is different than the first plurality of basic process function blocks, wherein each of the second plurality of basic process function blocks are functions performed at a node within a data plane for each service, traffic flow, or virtual network handled by the SDP controller in accordance with network component capabilities and the QoS or QoE requirement, wherein the first plurality of basic process function blocks or the second plurality of basic process function blocks comprise functionality for at least one of flow control, rate matching, reliability, data recovery, data security, data forwarding, out-of-order control, fragmentation, reassembly, compression, congestion, error control, deep packet inspection (DPI), packet filtering, or address translation;
  indicating, by the SDP controller, a second workflow and status information for each of the second plurality of basic process function blocks to the network component, the second workflow and the status information determined for one or more network components along a path allocated for the service, traffic flow, or virtual network in accordance with the received QoS or QoE requirement, wherein the second workflow comprises an order of performing the second plurality of basic process function blocks at the network component along the path; and
  configuring, by the SDP controller, the network component to implement the second workflow of the second plurality of basic process function blocks using a second protocol stack different than the first protocol stack and determined by the SDP controller in accordance with the received QoS or QoE requirement, a first combination of protocols in the first protocol stack being different than a second combination of protocols in the second protocol stack, wherein the second combination of protocols comprises at least one of a passenger protocol recognized by end-to-end hosts on a network path, a carrier protocol implementing the second plurality of basic process function blocks, or a transport protocol for transporting traffic between components on the network path.

7. The method of claim 6, wherein the path includes network components having different data plane processing capabilities and functionality.

8. The method of claim 6, wherein the basic process function blocks are determined for the data plane process of the service, traffic flow, or virtual network according to a data plane process capability of each considered component along the path.

9. The method of claim 8 further comprising obtaining the data plane process capability of each considered component from a database of network node capability.

10. The method of claim 6, wherein the path includes one or more SDP-enabled components configurable by the SDP controller.

11. The method of claim 10, wherein the path further includes one or more non-SDP-enabled components that are not configurable by the SDP controller, and wherein the basic process function blocks are determined for the one or more SDP-enabled components considering the data plane process of the one or more non-SDP-enabled components.

12. The method of claim 6, wherein the path includes one or more SDP-enabled end devices or user devices configurable by the SDP controller.

13. A method for providing software defined protocol (SDP), the method comprising:
  receiving, by an SDP controller from a software defined networking (SDN) controller, indication of a path including a network component and corresponding network resource allocation;
  receiving, by the SDP controller, a quality of service (QoS) or quality of experience (QoE) requirement;
  forming, by the SDP controller, a protocol stack for managing a data plane process, the protocol stack comprising a combination of carrier protocols determined in accordance with the QoS or QoE requirement and a plurality of basic process function blocks, wherein each of the basic process function blocks are functions performed at a node within a data plane, and wherein the plurality of basic process function blocks are obtained by breaking down the data plane process in accordance with network component capabilities and the QoS or QoE requirement, wherein the combination of carrier protocols comprises at least one of a passenger protocol recognized by end-to-end hosts on a network path, a carrier protocol implementing a subset of the plurality of basic process function blocks, or a transport protocol for transporting traffic between components on the network path;

interacting, by the SDP controller, with the SDN controller for determining a path for data forwarding according to the protocol stack; and configuring, by the SDP controller, one or more network components or devices on the path to implement the plurality of basic process function blocks using the protocol stack, wherein the basic process function blocks comprise functionality for at least one of flow control, rate matching, reliability, data recovery, data security, data forwarding, out-of-order control, fragmentation, reassembly, compression, congestion, error control, deep packet inspection (DPI), packet filtering, or address translation.

14. The method of claim 13, wherein the SDP controller and the SDN controller interact jointly to determine the path, wherein the plurality of basic process function blocks of the protocol stack are for the one or more network components or devices on the path.

15. The method of claim 14 further comprising:
determining that the path or one or more network components or devices are not configurable to implement the protocol stack;
requesting, from the SDN controller, an updated path upon determining that the path or one or more network components or devices are not configurable to implement the protocol stack;
interacting with the SDN controller for determining the updated path comprising one or more updated network components or devices; and
configuring the one or more updated network components or devices in the updated path to implement the basic process function blocks using the protocol stack.

16. The method of claim 13, wherein the SDP controller and the SDN controller interact jointly to determine the path, wherein the path is indicated by SDN controller to the SDP controller, and wherein the protocol stack is determined by the SDP controller considering the path.

17. The method of claim 13 further comprising interacting with a control entity for performing software defined topology management for mapping between service logical topology and data plane logical topology.

18. The method of claim 17, wherein interacting with a control entity comprises:
receiving, at the SDP controller from the control entity, an indication of required data processes for the one or more network components or other network components in a determined data plane topology; and
configuring the one or more network components considering the indication of required data processes.

19. The method of claim 13 further comprising:
configuring, using the SDP controller, an ingress SDP network component for at least a segment in the path to translate data packets of a passenger protocol to data packets of a carrier protocol of the combination of carrier protocols; and
configuring an egress SDP network component for the segment in the path to translate data packets of the carrier protocol to data packets of the passenger protocol,
wherein the segment does not include a component configurable by the SDP controller.

20. A network device supporting software defined protocol (SDP), the network device comprising:
at least one processor; and
a non-transitory computer readable storage medium storing programming comprising an SDP controller for execution by the at least one processor, the programming including instructions that, when executed by the at least one processor, cause the network device to:
receive, from a software defined networking (SDN) controller, indication of a path including a network component and corresponding network resource allocation;
break down a data plane process for a service, traffic flow, or a virtual network into a plurality of basic process function blocks, wherein all of the basic process function blocks are functions performed at a node within a data plane;
configure the network component to implement a first subset of basic process function blocks using a first protocol stack comprising a first combination of protocols and the first subset of basic process function blocks, wherein the first combination of protocols is determined by the SDP controller, wherein the first subset of basic process function blocks or a second subset of basic process function blocks comprise functionality for at least one of flow control, rate matching, reliability, data recovery, data security, data forwarding, out-of-order control, fragmentation, reassembly, compression, congestion, error control, deep packet inspection (DPI), packet filtering, or address translation;
receive a quality of service (QoS) or a quality of experience (QoE) requirement; and
configure the network component to implement the second subset of basic process function blocks different than the first subset of basic process function blocks using a second protocol stack determined in accordance with the received QoS or QoE requirement, the second protocol stack comprising the second subset of basic process function blocks and a second combination of protocols determined by the SDP controller in accordance with the received QoS or QoE requirement and different than the first combination of protocols, wherein the second combination of protocols comprises at least one of a passenger protocol recognized by end-to-end hosts on a network path, a carrier protocol implementing the second subset of the plurality of basic process function blocks, or a transport protocol for transporting traffic between components on the network path.

21. The network device of claim 20, wherein the SDN controller is part of the network device.

22. The network device of claim 20, wherein the network component includes at least one of a network edge node, a network intermediate node or switch, and a user device.

23. A method by a network component for supporting software defined protocols (SDP), the method comprising:
implementing, at the network component using a first protocol stack determined by a SDP controller that receives indication of a path including the network component and corresponding network resource allocation, a first workflow of one or more of a first plurality of basic process function blocks corresponding to a first quality of service (QoS) or quality of experience (QoE) requirement;
receiving, from the SDP controller, a second workflow and status information for one or more of a second plurality of basic process function blocks that is different than the first plurality of basic process function blocks, wherein each of the basic process function blocks in the second plurality of basic process function blocks are functions performed at a node within a data plane, the second plurality of basic process function blocks generated by the SDP controller by breaking down a data plane process for a service, a traffic flow, or a virtual network in accordance with network component capabilities and a second QoS or QoE requirement different than the first QoS or QoE requirement, wherein the second workflow comprises an order of performing the second plurality of basic process function blocks at the network component, wherein the basic process function blocks comprise functionality for at least one of flow control, rate matching, reliability, data recovery, data security, data forwarding, out-of-order control, fragmentation, reassembly, compression, congestion, error control, deep packet inspection (DPI), packet filtering, or address translation; and implementing, at the network component using a second protocol stack that is different than the first protocol stack, the second workflow of the one or more of the second plurality of basic process function blocks corresponding to the second QoS or QoE requirement using the status information, wherein the second protocol stack is determined by the SDP controller, a first combination of protocols in the first protocol stack being different than a second combination of protocols in the second protocol stack, wherein the second combination of protocols comprises at least one of a passenger protocol recognized by end-to-end hosts on a network path, a carrier protocol implementing the second plurality of basic process function blocks, or a transport protocol for transporting traffic between components on the network path.

24. The method of claim 23 further comprising receiving, from a software defined networking (SDN) controller, path information for forwarding data of the service, traffic flow, or virtual network, the path information determining network nodes including the network component along a path allocated for the service, traffic flow, or virtual network.

25. The method of claim 23, wherein the basic process function blocks include functionality for at least one of flow control, rate matching, reliability, data recovery, data security, data forwarding, out-of-order control, fragmentation, reassembly, compression, congestion, error control, deep packet inspection (DPI), packet filtering, and address translation.

26. A network component supporting software defined protocols (SDP), the network component comprising:
at least one processor; and
a non-transitory computer readable storage medium storing programming for execution by the at least one processor, the programming including instructions to:
implement, using a first protocol stack determined by a SDP controller that receives indication of a path including the network component and corresponding network resource allocation, a first workflow of one or more of a first plurality of basic process function blocks corresponding to a first quality of service (QoS) or quality of experience (QoE) requirement;
receive, from the SDP controller, a second workflow and status information for one or more of a second plurality of basic process function blocks that is different than the first plurality of basic process function blocks, wherein each of the second plurality of basic process function blocks are functions performed at a node within a data plane, the second plurality of basic process function blocks generated by the SDP controller by breaking down a data plane process for a service, a traffic flow, or a virtual network in accordance with network component capabilities and a second QoS or QoE requirement different than the first QoS or QoE requirement, wherein the second workflow comprises an order of performing the second plurality of basic process function blocks at the network component, wherein the basic process function blocks comprise functionality for at least one of flow control, rate matching, reliability, data recovery, data security, data forwarding, out-of-order control, fragmentation, reassembly, compression, congestion, error control, deep packet inspection (DPI), packet filtering, or address translation; and implement, using a second protocol stack that is different than the first protocol stack, the second workflow of the one or more of the second plurality of basic process function blocks corresponding to the second QoS or QoE requirement using the status information, wherein the second protocol stack is determined by the SDP controller, a first combination of protocols in the first protocol stack being different than a second combination of protocols in the second protocol stack, wherein the second combination of protocols comprises at least one of a passenger protocol recognized by end-to-end hosts on a network path, a carrier protocol implementing the second plurality of basic process function blocks, or a transport protocol for transporting traffic between components on the network path.

27. The network component of claim 26, wherein the programming includes further instructions to receive, from a software defined networking (SDN) controller, path information for forwarding data of the service, traffic flow, or virtual network, wherein the path information determines network nodes including the network component along a path allocated for the service, traffic flow, or virtual network.

28. The network component of claim 26, wherein the network component is an SDP-enabled end device or user device configurable by the SDP controller.

29. The method of claim 1, wherein the SDP controller determines the second protocol stack determined in accordance with the received QoS or QoE requirement before the second subset of the plurality of basic process function blocks are in service.

30. The method of claim 1, further comprising:
receiving, by the SDP controller from the SDN controller, indication of a plurality of paths including corresponding network components; and
selecting, by the SDP controller, a path of the plurality of paths such that corresponding network components corresponding to the path satisfy requirements of the second combination of protocols.

31. A network device for providing software defined protocols (SDP), the network device comprising:
at least one processor; and
a non-transitory computer readable storage medium storing programming for execution by the at least one processor, the programming including instructions to:
receive, from a software defined networking (SDN) controller, indication of a path including a network component and corresponding network resource allocation;
configure, by the SDP controller, the network component to implement a first subset of a plurality of basic process function blocks using a first protocol stack comprising a first combination of protocols determined by the SDP controller, each of the plurality of basic process function blocks performing a function within a data plane, and the plurality of basic process function blocks performing a data plane process, wherein the basic process function blocks comprise functionality for at least one of flow control, rate matching, reliability, data recovery, data security, data forwarding, out-of-order control, fragmentation, reassembly, compression, congestion, error control, deep packet inspection (DPI), packet filtering, or address translation;

receive, by the SDP controller, a quality of service (QoS) or quality of experience (QoE) requirement; and configure, by the SDP controller, the network component to implement a second subset of the plurality of basic process function blocks using a second protocol stack determined in accordance with the received QoS or QoE requirement, wherein the second subset of the plurality of basic process function blocks is different than the first subset of the plurality of basic process function blocks, the second protocol stack comprises a second combination of protocols determined by the SDP controller in accordance with the received QoS or QoE requirement and comprising a transport protocol, and the second combination of protocols is different from the first combination of protocols, wherein the second combination of protocols comprises at least one of a passenger protocol recognized by end-to-end hosts on a network path, a carrier protocol implementing the second subset of the plurality of basic process function blocks, or the transport protocol for transporting traffic between components on the network path.

32. A network device for providing software defined protocols (SDP), the network device comprising:
at least one processor; and
a non-transitory computer readable storage medium storing programming for execution by the at least one processor, the programming including instructions to:

receive, by an SDP controller from a software defined networking (SDN) controller, indication of a path including a network component and corresponding network resource allocation;

receive, by the SDP controller, a quality of service (QoS) or quality of experience (QoE) requirement;

form, by the SDP controller, a protocol stack for managing a data plane process, the protocol stack comprising a combination of carrier protocols determined in accordance with the QoS or QoE requirement and a plurality of basic process function blocks, wherein each of the basic process function blocks are functions performed at a node within a data plane, and wherein the plurality of basic process function blocks are obtained by breaking down the data plane process in accordance with network component capabilities and the QoS or QoE requirement, wherein the combination of carrier protocols comprises at least one of a passenger protocol recognized by end-to-end hosts on a network path, a carrier protocol implementing a subset of the plurality of basic process function blocks, or a transport protocol for transporting traffic between components on the network path;

interact, by the SDP controller, with the SDN controller for determining a path for data forwarding according to the protocol stack; and configure, by the SDP controller, one or more network components or devices on the path to implement the plurality of basic process function blocks using the protocol stack, wherein the basic process function blocks comprise functionality for at least one of flow control, rate matching, reliability, data recovery, data security, data forwarding, out-of-order control, fragmentation, reassembly, compression, congestion, error control, deep packet inspection (DPI), packet filtering, or address translation.

* * * * *